No. 851,217. PATENTED APR. 23, 1907.
C. E. BENSON.
LATHE TURRET.
APPLICATION FILED JULY 16, 1906.

2 SHEETS—SHEET 1.

Witnesses:
Elmer R. Shipley.
M. S. Belden.

Inventor
Charlie Olbert Benson
by James W. See
Attorney

No. 851,217. PATENTED APR. 23, 1907.
C. E. BENSON.
LATHE TURRET.
APPLICATION FILED JULY 16, 1906.
2 SHEETS—SHEET 2.
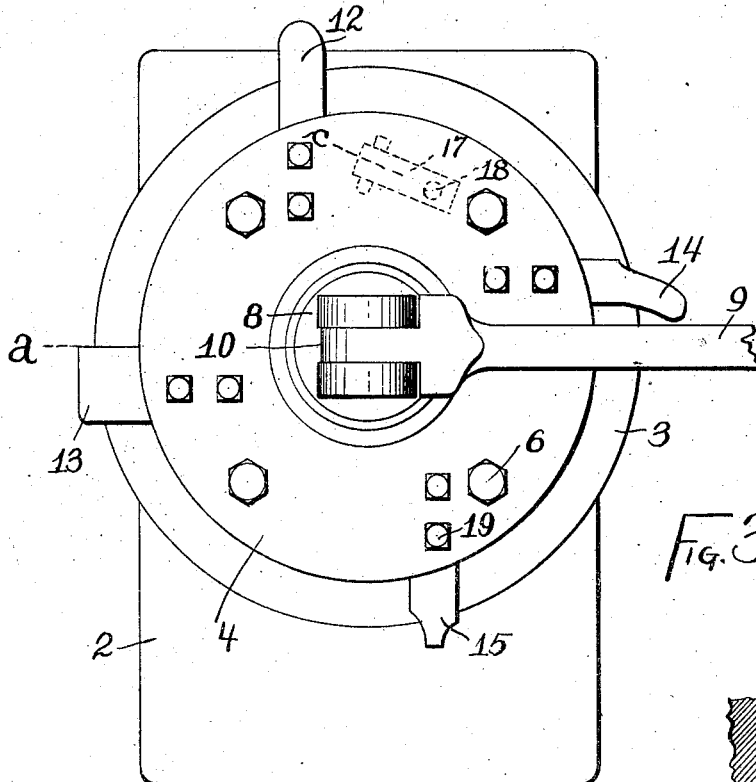
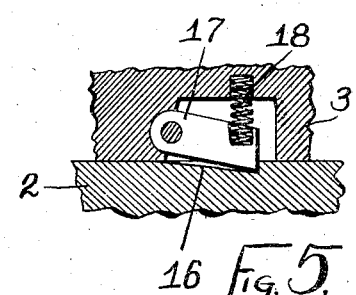
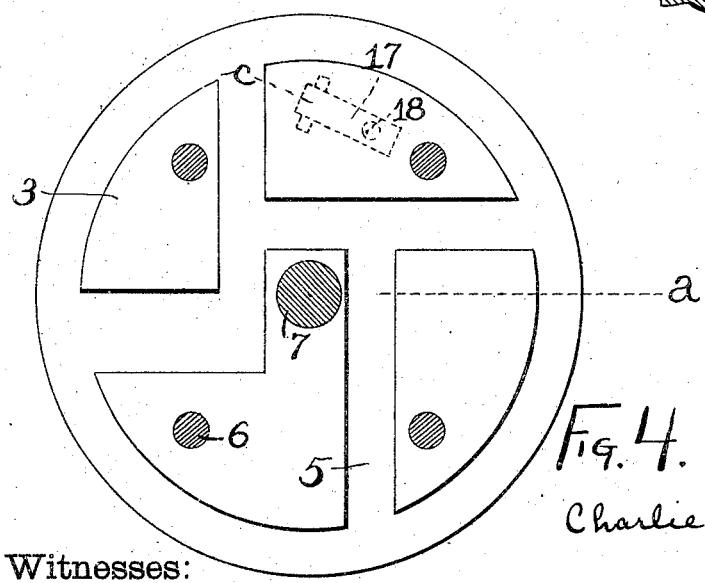
Witnesses:
Elmer R. Shipley.
M. S. Belden.
Charlie Elbert Benson
Inventor
by James W. S&E
Attorney

UNITED STATES PATENT OFFICE.

CHARLIE ELBERT BENSON, OF BUFFALO, NEW YORK, ASSIGNOR TO NILES-BEMENT-POND COMPANY, OF JERSEY CITY, NEW JERSEY.

LATHE-TURRET.

No. 851,217.  Specification of Letters Patent.  Patented April 23, 1907.

Application filed July 16, 1906. Serial No. 326,399.

*To all whom it may concern:*

Be it known that I, CHARLIE ELBERT BENSON, a citizen of the United States, residing at Buffalo, Erie county, New York, have invented certain new and useful Improvements in Lathe-Turrets, of which the following is a specification.

This invention will be readily understood from the following description taken in connection with the accompanying drawing in which:—

Figure 1:
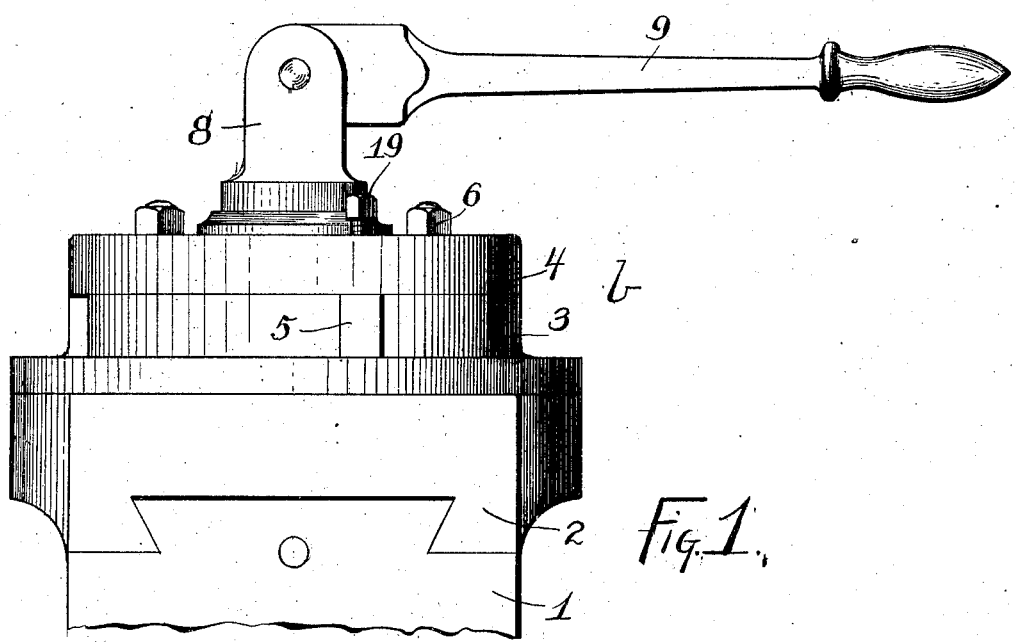
Figure 2:
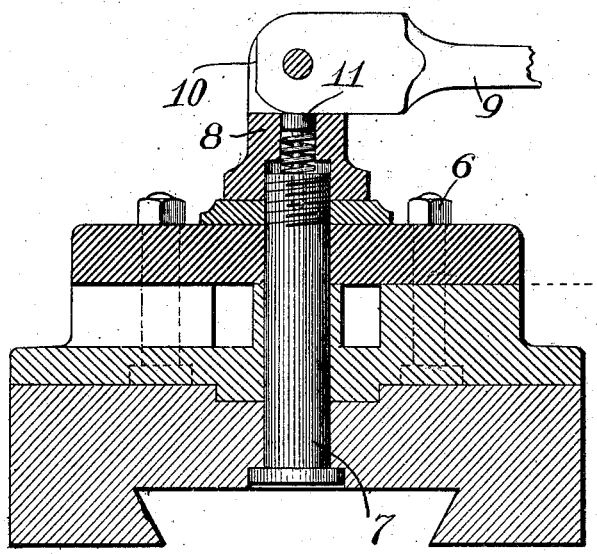

Figure 1 is a front elevation of a lathe turret embodying my invention: Fig. 2 a vertical section (plane of line *a*) of Figs. 3 and 4: Fig. 3 a plan: Fig. 4 a horizontal section in the plane of line *b* of Figs. 1 and 2: and Fig. 5 a vertical section in the plane of line *c* of Fig. 4.

My improved turret, while adapted for other uses and situations is primarily designed for the turning of car wheel tires and, in such use, is to form part of the tool rest of the lathe carriage.

In the drawing:—1, indicates the lathe carriage: 2, the tool-rest sliding thereon and in the present case, supporting the turret: 3, the base of the turret: 4, the turret-top: 5, grooves in the turret base to receive the tools, each groove extending straight inwardly from the periphery of the turret base in a non-radial direction and transversely into one of the other grooves: 6, bolts clamping the turret-top rigidly to the base: 7, an axially disposed bolt clamping the turret parts as a unit to the tool rest: 8, a nut on the upper end of the bolt 7: 9, a lever horizontally pivoted to the nut: 10, a flat face on the heel of the lever at right angles to its length: 11, a spring plunger disposed vertically in the nut and bearing upwardly against the heel of the lever: 12, 13, 14 and 15, the tools, seated in the grooves 5: 16, a notch in the tool rest, under the turret, one notch for each tool: 17, an automatic pawl carried by the turret-base and engaging the notches 16: 18, a spring urging the pawl downwardly: and 19, setscrews in the turret-top over the tool-holding grooves to clamp the tools.

With the typical tools illustrated, 12 may rough off the tread; 13, a broad tool, finish the tread; 14, dress the face of the flange; and 15 dress the back of the flange and the outer corner of the tread.

The bolts 6 clamp the two-part turret into solid condition; set screws 19 clamp the tools in the turret; the lever and nut serve in clamping the turret solidly to the tool-rest; the plunger 11 retains the lever in upright idle position, out of the way; the pawl resists the angular thrusts imposed by the cut or by the lever. The pawl automatically yields as the turret is turned to bring a new tool to position, hence, while the thrusts are solidly met, the thrust-resisting agent requires no actuation or attention.

I claim:—

1. A turret-support, a turret thereon, a central bolt uniting the turret and support, a nut on the bolt, a lever horizontally pivoted to the nut, and means for supporting the lever in idle vertical position, combined substantially as set forth.

2. A turret-support, a turret thereon, a central bolt uniting the turret and support, a nut on the bolt, a lever horizontally pivoted to the nut, and a spring plunger cooperating with the lever and nut to hold the lever in idle vertical position, combined substantially as set forth.

3. A turret support provided with notches on its upper surface, a turret mounted on said support and provided with sockets for the reception of cutting tools to project outwardly from the turret, a pivotal union between the turret and support to permit the turret to be adjusted angularly, a screw clamping device to bind the turret to the support after adjustment, and a spring pawl pivoted in the base of the turret and co-operating with the notches in the support and adapted to automatically engage one of the notches and resist the angular thrusts of the tool when cutting and to resist angular thrusts of the clamping device when being tightened, combined substantially as set forth.

CHARLIE ELBERT BENSON.

Witnesses:
G. J. MERDENBAUER,
R. E. BENSON.